Dec. 23, 1958   H. C. KEMPER ET AL   2,865,242
HANDWHEEL ACTUATED MACHINE TOOL MECHANISM
Filed April 4, 1957                    2 Sheets-Sheet 1

INVENTOR.
HARRY C. KEMPER AND
CHARLES J. HUNT.
BY Willard S. Grout
ATTORNEY.

Dec. 23, 1958   H. C. KEMPER ET AL   2,865,242
HANDWHEEL ACTUATED MACHINE TOOL MECHANISM
Filed April 4, 1957   2 Sheets-Sheet 2

INVENTOR.
HARRY C. KEMPER AND
CHARLES J. HUNT.
BY Willard S. Groen
ATTORNEY.

United States Patent Office 2,865,242
Patented Dec. 23, 1958

2,865,242

HANDWHEEL ACTUATED MACHINE TOOL MECHANISM

Harry C. Kemper, Goshen Township, Clermont County, Ohio, and Charles J. Hunt, Covington, Ky., assignors to The R. K. Le Blond Machine Tool Company, Cincinnati, Ohio, a corporation of Delaware Application April 4, 1957, Serial No. 650,655

1 Claim. (Cl. 82—31)

This invention pertains to handwheel actuated machine tool mechanism and is particularly directed to a handwheel apparatus operable to actuate a machine element at different speeds from the rotation of the handwheel.

One of the objects of this invention is to provide a handwheel actuating device for actuating a machine tool element at a plurality of different rates of travel by the manipulation of the control handle on the rim of the handwheel.

Another object of this invention is to provide a handwheel actuator for a machine element in which the ratio of drive between the handwheel and the machine element to be moved is varied solely from manipulation of the actuating handle on the handwheel.

And another object is to provide an improved multispeed handwheel control for a tailstock of a lathe wherein the axial shifting of the actuating handle on the rim of the handwheel effects a ratio change of drive between handwheel rotation and the movement of the machine element.

And still a further object of this invention is to provide in a tailstock for a lathe having a rotatable actuating shaft and an actuating handwheel mounted coaxially thereof, a differential ratio change drive between said handwheel and said shaft including means to actuate said ratio change drive for selecting different ratios by the axial shifting of the control handle of the handwheel.

Further features and advantages of this invention will appear from a detailed description of the drawings in which.

Figure 1:
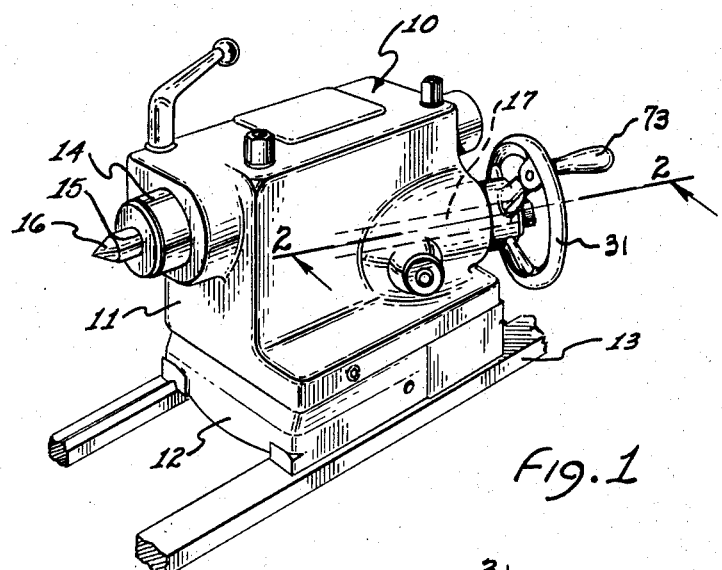
Fig. 1 is a perspective view of a lathe tailstock incorporating the features of this invention.

As an example of one embodiment of this invention in a handwheel actuated machine tool mechanism, there is shown a tailstock 10, such as illustrated in Patent 2,391,154 issued December 18, 1945, having the main body 11, and the bottom 12 suitably supported and clamped on the lathe bed 13. The tailstock 10 has the usual barrel 14 and tapered front end bore 15 in which may be mounted the center 16 and drills, reamers, boring tools and the like in conventional manner when using the lathe. The barrel 14 is reciprocated in the body 11 by suitable mechanism, not herein illustrated as forming no part of the present invention, such as the worm and rack shown in Patent 2,391,154, which worm or other device is actuated from the handwheel shaft 17 journalled in the bore 18 of a sleeve 19 supported in the body 11 of the tailstock 10. The shaft 17 is journaled against axial movement in the sleeve 19 by use of an anti-friction thrust bearing 20 located between the face 21 on the shaft 17 and the face 22 on the fixed gear hub 23 which is bolted to the face 24 of the body 11 by suitable screws 25. A thrust collar 26 engages the face 27 on the fixed gear hub 23 and is backed up for proper running fit by a lock nut 28 threadedly mounted at 29 on the shaft 17 and locked in adjusted position thereon by the set screw 30.

The actuating handwheel 31 has a hub 32 having a bore 33 which fits over the cylindrical surface 34 of the carrier plate 35 and is locked thereto by a key 36. The carrier plate 35 has a bore 37 in which is mounted the direct drive clutch bush 38 in turn locked to the carrier plate 35 by a key 39. The bush 38 has a bore 40 which is journaled on the surface 41 of the shaft 17. A thrust collar 42 having a bore 43 mounted on the surface 41 of the shaft 17 is provided with a keyway 44 engaged by a pin 45 fixed in the shaft 17 so that the thrust collar rotates with the shaft 17. A suitable adjustable back-up nut 46 threadedly mounted at 47 on the shaft 17 is locked in suitable adjusted position thereon by the set screw 48.

The carrier plate 35 has a flange portion 49 which is rigidly secured to a carrier member 50 by suitable screws 51 and pins 52, so that the handwheel 31, carrier plate 35, and a carrier form an integrally rotatable handwheel structure. The carrier 50 has a bore 53 which is journaled on the bearing surface 54 on the fixed gear hub 23 so that the entire rigidly connected assembly of the handwheel 31 and its hub 32, the carrier plate 35, the direct drive clutch bush 38, and the carrier member 50 are rotatably journaled at 41 on the shaft 17 and at 54 on the fixed gear hub 23. A suitable thrust collar 55 on the shaft 17 limits inward axial movement of the just recited rotatable assembly.

Formed on the fixed gear hub 23 is the gear 56 which is engaged by a gear 57 of the planetary differential double gear 57–58 journaled to freely revolve in the bearing bores 59 and 60 formed respectively in the carrier member 50 and the flange 49 of the carrier plate 35, the two gears 57 and 58 being rigidly connected together by a suitable pin 61. The gear 58 is of smaller pitch diameter and number of teeth than the gear 57 and engages the slow speed clutch gear 62 which is journaled by its bore 63 on the bearing surface 64 of the shaft 17 and is confined against axial movement between the end face 65 of the fixed gear hub 23 and the face 66 of the flange 49 of the carrier plate 35.

Figure 2:
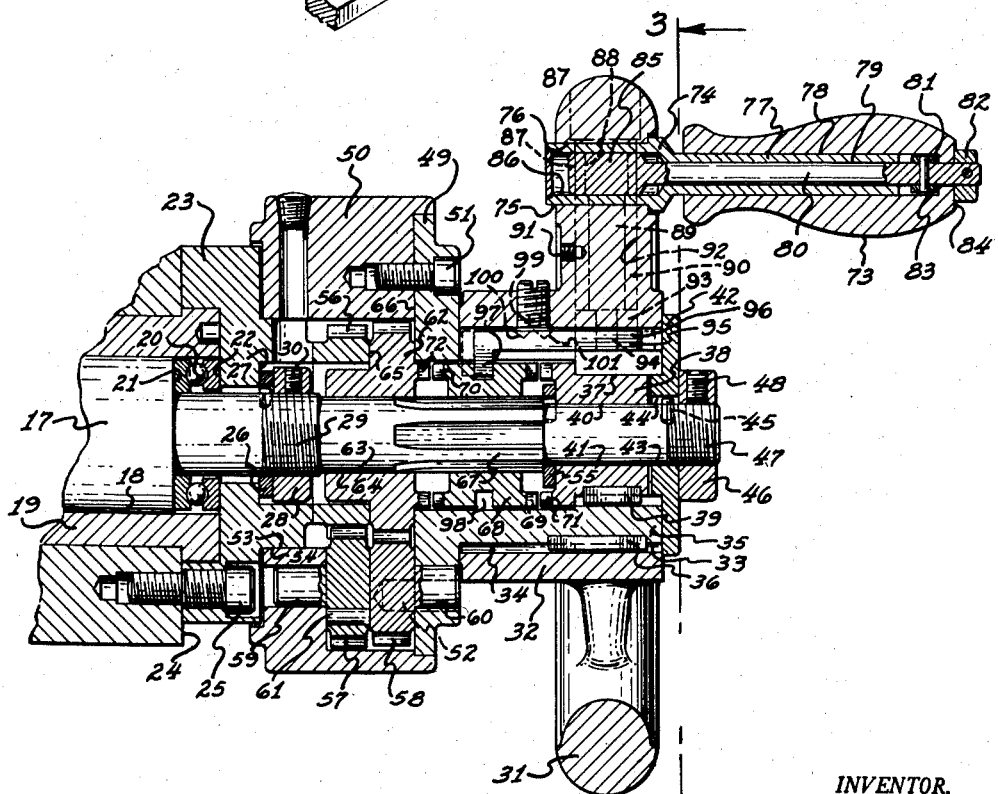
Fig. 2 is an enlarged section on the line 2—2 of Fig. 1.
Figure 3:
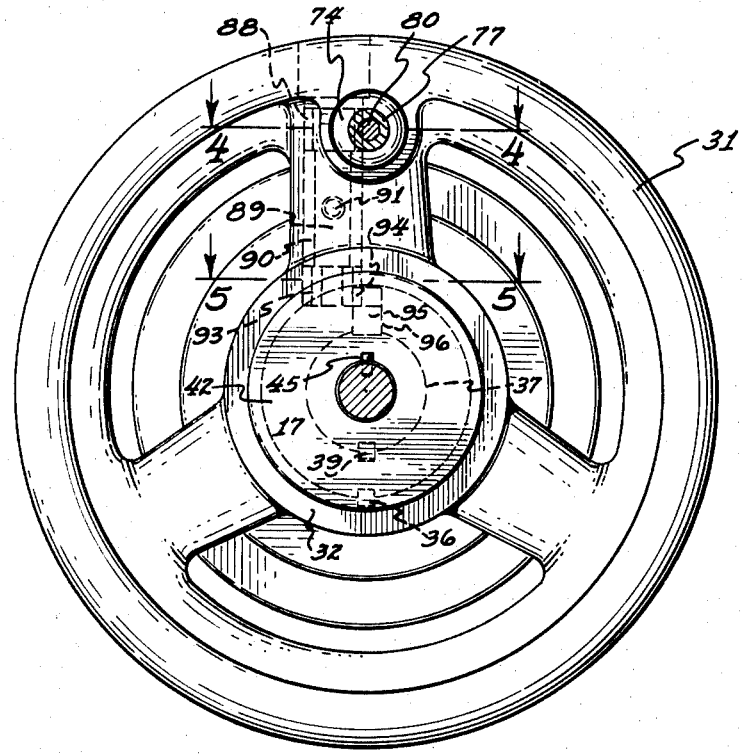
Fig. 3 is a section on the line 3—3 of Fig. 2.
Figure 4:
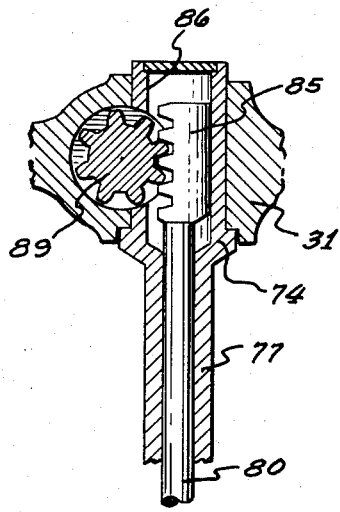
Fig. 4 is an enlarged fragmentary section on the line 4—4 of Fig. 3.
Figure 5:
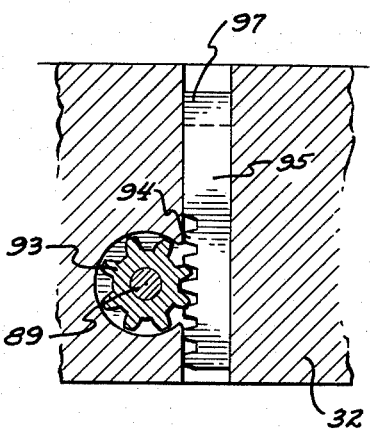
Fig. 5 is an enlarged fragmentary section on the line 5—5 of Fig. 3.

Slidably mounted on axially slidable driving connection on the splined portion 67 of the shaft 17 is the shiftable clutch spool 68 having clutch teeth 69 and 70 on each end face thereof. When the clutch spool 68 is shifted to the right, Fig. 2, its clutch teeth 69 engage mating clutch teeth 71 provided on the bush 38 so as to lock the handwheel 31 directly to the shaft 17. When the clutch spool is shifted to the left, Fig. 2, its clutch teeth 70 engage mating clutch teeth 72 on the slow speed clutch gear 62. Under these conditions of engagement of the clutch teeth 70—72, the rotation of the handwheel 31 causes gear 57 to roll around gear 56 which in turn causes gear 58 to slowly revolve gear 62 at a reduced speed from that of the handwheel 31 and to impart this slow relative movement to the shaft 17 (at this time disconnected from the handwheel) through the clutch spool 68.

The clutch spool 68 is shifted by the manipulation of the control handle 73 of the handwheel 31. To this end there is provided a handle bushing 74 having a cylindrical surface 75 which is rigidly fitted into the bore 76 in the rim of the handwheel 31, the bushing having an elongated stem 77 having a cylindrical surface 78 upon which is rotatably and axially slidably mounted the control handle 73. Axially slidable in the bore 79 formed in the bushing 74 is the shifter stem 80, collars 81 and 82 being suitably fixed on the outer end of the stem 80 each side of the respective faces 83 and 84 of the control handle 73, so that the handle 73 is axially confined but relatively rotatable with respect to said stem 80.

The inner end of the shifter stem 80 is provided with an enlarged head 85 sliding in the enlarged bore 86 in bushing 74 and has vertically positioned rack teeth 87 formed therein which engage a pinion 88 fixed on the radially disposed pinion shaft 89 journaled in a suitable bearing bushing 90 fixed by a set screw 91 in the bore 92 in the handwheel 31. Fixed to the inner end of the pinion shaft 89 is a gear 93 which engages a rack 94 formed in the shifter key 95 which is slidably mounted in the keyway 96 formed in the hub 32 of the handwheel 31. An inwardly extending lug 97 formed integral with the key 95 engages in the annular groove 98 in the clutch spool 68 so as to shift the spool to one or the other of the clutch engagement positions 69—71 and 70—72 by longitudinally sliding of the key 95. Thus, through the mechanism just described, when the handle is pushed inwardly toward the handwheel 31 the low speed drive for the shaft 17 is effected by engagement of the clutches 70—72. When the handle 73 is pulled outwardly away from the handwheel the direct drive connection of the handwheel with the shaft 17 is effected by engagement of clutches 69—71. A suitable ball detent 99 in the hub 32 of the handwheel 31 engaging in the detent notches 100 and 101 serve to yieldingly secure the handle 73 and clutch spool 68 in either selected position of direct or low speed drive.

Thus, by providing the above described two-speed drive to actuate the tailstock barrel (or either similar machine tool element) as when drilling in the lathe, the operator can move the drill rapidly to cutting position by direct drive and then instantly push in on the operating handle 73, while still keeping his hand on the handle being used to rotate the handwheel, to shift to low speed for drilling. After completion of the drilling, and with the hand still on the operating handle, the handle 73 is pulled out and fast return of the tailstock barrel effected. Thus, both high and low speed actuation in either direction can be instantly obtained without at any time removing the operator's hand from handle 73. The whole operation is thus carried out by a single handle control from the operating handle 73 in the handle without requiring the use of the other hand to operate the change speed mechanism and without taking the operator's hand off of the handle 73 to thus free the other hand at all times for controlling the work and tools to be engaged by the tailstock barrel.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claim are intended to be included herein.

Having thus fully set forth and described this invention what is claimed and desired to be obtained by United States Letters Patent is:

A multi-speed handwheel drive for a movable machine tool mechanism having a body, a movable element on said body, a drive shaft in said body rotatable to actuate said element on said body, a rotatable handwheel structure journalled coaxially of said drive shaft, a shiftable clutch moveable to one position to directly connect said handwheel structure to rotate said drive shaft, a differential planetary gear train including a gear fixed on said body, a gear journalled coaxially of said drive shaft, and a planetary differential double gear journalled in said handwheel structure simultaneously engaging both of said aforementioned gears, and single handle control means on the rim of said handwheel structure connected to actuate said shiftable clutch and projecting outwardly axially from said rim parallel to the axis of rotation of said handwheel, wherein said single handle control means comprises an axially shiftable handle extending outwardly from the rim of said handwheel, and means in said handwheel actuated by the axial shifting of said handle comprising a shifter stem in said handle, a rack on the inner end of said stem, a pinion engaged by said rack and having a radially inwardly extending shaft with a gear fixed thereon in the hub of said handwheel, a shiftable key in said hub having a rack engaged by said last mentioned gear, detent means in said hub engaging said key, a means connecting said key to actuate said shiftable clutch.

References Cited in the file of this patent

UNITED STATES PATENTS

| | | |
|---|---|---|
| 437,068 | Whiton | Sept. 23, 1890 |
| 1,299,765 | Norton et al. | Apr. 8, 1919 |
| 1,484,565 | Riker | Feb. 19, 1924 |
| 2,354,266 | Kemper et al. | July 25, 1944 |
| 2,369,209 | Bullard et al. | Feb. 13, 1945 |
| 2,391,154 | Groene | Dec. 18, 1945 |
| 2,721,591 | Criswell | Oct. 25, 1955 |

FOREIGN PATENTS

| | | |
|---|---|---|
| 62,935 | France | June 30, 1955 |
| 69,437 | Austria | July 26, 1915 |